United States Patent [19]
Haase et al.

[11] 3,926,162
[45] Dec. 16, 1975

[54] FUEL CONTROL APPARATUS
[75] Inventors: Elmer A. Haase; James M. Kirwin, both of South Bend, Ind.
[73] Assignee: The Bendix Corporation, South Bend, Ind.
[22] Filed: Dec. 19, 1973
[21] Appl. No.: 426,397

[52] U.S. Cl. .................... 123/139 A; 123/140 MC
[51] Int. Cl.² .......................................... F02D 1/04
[58] Field of Search.. 123/140 MC, 139 A, 139 AH; 137/500, 503, 505.3, 505.29; 251/335 B; 74/18, 18.2

[56] References Cited
UNITED STATES PATENTS

| | | | |
|---|---|---|---|
| 2,082,325 | 6/1937 | Cross | 137/505.29 |
| 2,264,656 | 12/1941 | Briscoe et al. | 74/18.2 |
| 2,281,417 | 4/1942 | Darby | 251/335 B |
| 2,301,031 | 11/1942 | Ferguson | 137/505.3 |
| 3,114,359 | 12/1963 | Haase | 137/500 |
| 3,698,369 | 10/1972 | Vuaille | 123/140 FG |

*Primary Examiner*—Charles J. Myhre
*Assistant Examiner*—Paul Devinsky
*Attorney, Agent, or Firm*—Gordon H. Chenez; William N. Antonis

[57] ABSTRACT

A combustion engine fuel control including a push rod actuated fuel valve which is actuated by a pair of spaced apart diaphragms operatively connected to the push rod, one of which diaphragms is exposed to pressurized air and the other of which is exposed to pressurized fuel. The push rod is exposed to both pressurized air and pressurized fuel which are isolated by a miniature bellows one end of which is connected to the push rod and the opposite end of which is secured to a fixed support or wall through which the push rod slidably extends. The relatively small size of the bellows permits a predetermined range of flexing with a minimum spring rate effect imposed on the push rod.

5 Claims, 1 Drawing Figure

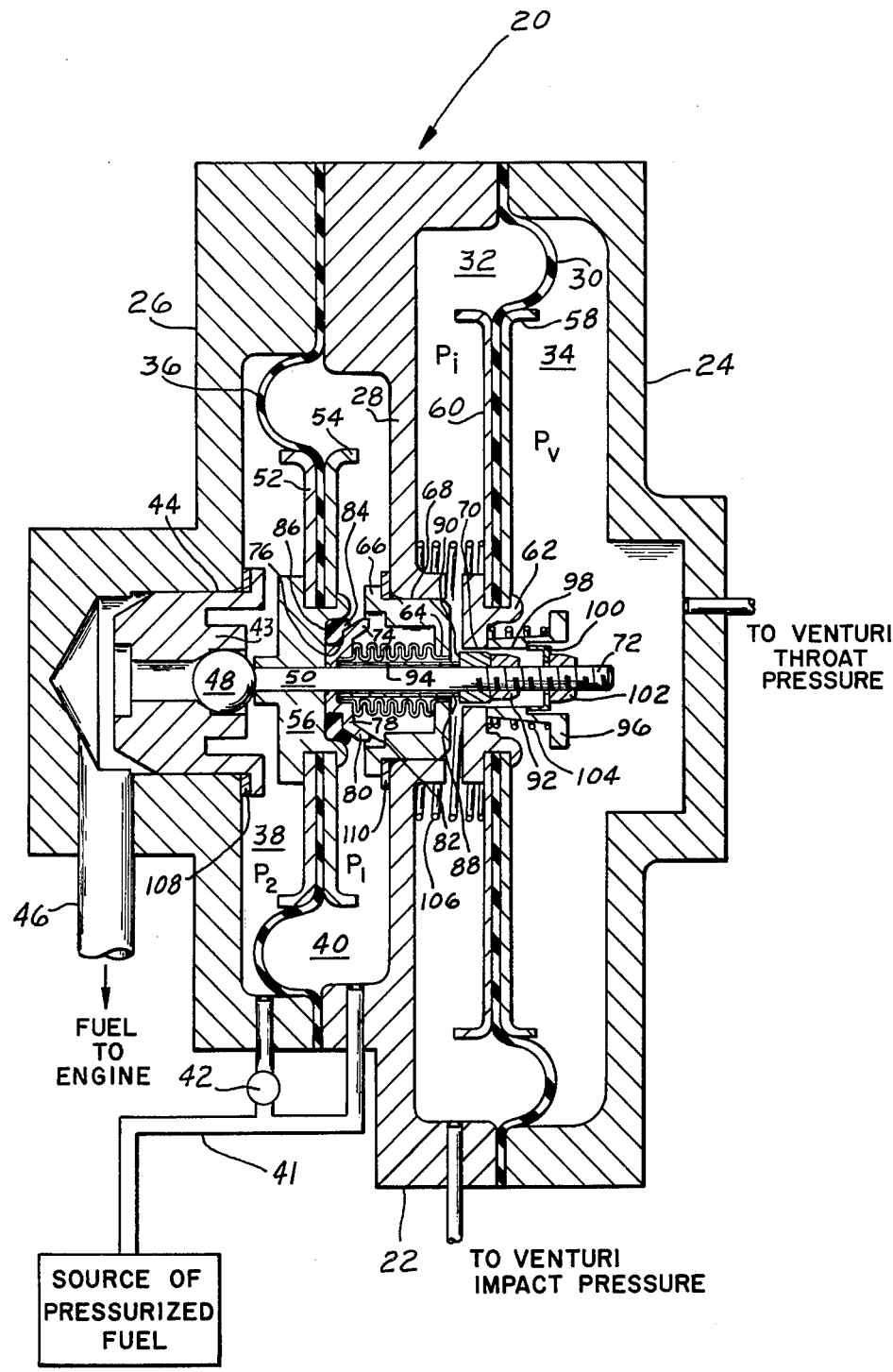

FUEL CONTROL APPARATUS

BACKGROUND OF THE INVENTION

The present invention is an improvement of the fuel control apparatus shown and described in U.S. Pat. No. 3,114,359 issued Dec. 17, 1963 in the name of E. A. Haase and having a common assignee.

Fuel controls of the type shown in U.S. Pat. No. 3,114,359 as well as the present invention are designed to control fuel flow by means of an input force generated by an air pressure responsive diaphragm and an opposing force generated by a fuel pressure responsive diaphragm which forces are imposed on a rod actuated fuel valve to control fuel flow to the engine as a function of mass air flow to the engine.

It will be understood that it is desirable to eliminate or minimize, at least, extraneous forces such as spring loads, friction loads or the like which may be imposed on the valve actuating push rod thereby causing force unbalance between the air pressure responsive and fuel pressure responsive diaphragms. In particular, such extraneous forces are a problem when the force derived from the air pressure responsive diaphragm is relatively small as, for example, at engine idle where fuel flow to the engine is at a minimum. A particular problem area exists due to the requirement for a fluid seal which is adapted to isolate the pressurized air and fuel and through which the valve actuating push rod extends. Various forms of such seals have been utilized among which is the seal shown in U.S. Pat. No. 3,114,359 which is not entirely satisfactory from the standpoint of frictional drag imposed by the seal on the actuating rod slidably extending therethrough which sliding also results in wear of the seal. Furthermore, assembly and disassembly problems are directly related to the complexity of a seal mechanism which complexity is reflected in proportionally higher manufacturing and maintenance expense.

It is therefore an object of the present invention to provide a combustion engine fuel control capable of regulating fuel accurately and consistently in response to a variable condition of engine operation.

It is an object of the present invention to provide a combustion engine fuel control having simple and reliable seal mechanism for isolating a control pressurized air from a controlled pressurized fuel and flexibly supporting a movable control member extending therethrough.

It is an important object of the present invention to provide a combustion engine fuel control having an axially movable control rod member exposed to a control pressurized air and a controlled pressurized fuel and provided with a bellows seal fixedly secured thereto to isolate the pressurized air and pressurized fuel.

Other objects and advantages will be apparent from the following description and accompanying drawings.

BRIEF DESCRIPTION OF THE DRAWING

The drawing represents fuel control apparatus embodying the present invention.

DESCRIPTION OF THE PREFERRED EMBODIMENT

Referring to the drawing, numeral 20 represents a portion of a fuel metering unit shown and described in detail in the heretofore mentioned U.S. Pat. No. 3,114,359 to which reference is made for specific details not necessary to fully understand the present invention. In general, the portion of the fuel metering section shown includes a multisection casing 22 having an air section 24 and a fuel section 26 separated by a wall 28.

The air section 24 includes a diaphragm 30 fixedly secured at its outermost portion to casing 22 and separating a chamber 32 from a chamber 34. Chambers 34 and 32 are vented to venturi throat air pressure $P_t$ and impact air pressure $P_i$, respectively, derived from a venturi, not shown, through which air flow to the engine is directed.

The fuel section 26 includes a diaphragm 36 fixedly secured at its outermost portion to casing 22 and separating a chamber 38 from a chamber 40. Chambers 38 and 40 communicate with pressurized fuel at pressures $P_2$ and $P_1$, respectively, in a fuel supply conduit 41 supplying pressurized fuel to chamber 38. Fuel pressures $P_1$ and $P_2$ are derived from the upstream and downstream sides, respectively, of a fuel metering valve generally indicated by 42 and disposed in flow controlling position in conduit 41. The fuel pressure differential $P_1 - P_2$ across the metering valve 42 for a given area of the valve 42 determines the rate of metered fuel flow through conduit 41.

The chamber 38 is provided with a fuel outlet defined by an annular valve seat 43 fixedly secured in an opening 44 of casing 22 by any suitable means such as a press fit. The opening 44, in turn, discharges fuel to a passage 46 which feeds the fuel to an engine, not shown.

The effective flow area of the valve seat is controlled by a ball valve 48 adapted to seat thereon. The ball valve 48 is fixedly secured to one end of a rod or actuating stem 50 and is positioned relative to valve seat 43 in response to a force balance derived from diaphragms 30 and 36 as described in the above-mentioned U.S. Pat. No. 3,114,359.

The fuel diaphragm 36 is provided with backing plates 52 and 54 which are clamped against opposite sides thereof by a retaining member 56 suitably upset or otherwise connected to provide a rigid assembly. The rod 50 is axially aligned with diaphragm 36 and extends through retaining member 56 fixedly secured to rod 50 by any suitable means such as brazing or the like.

The air diaphragm 30 is provided with backing plates 58 and 60 clamped against opposite sides thereof by a retaining member 62 suitably upset or otherwise connected to provide a rigid assembly.

The rod 50 extends through an opening 64 in a cup-shaped fitting 66 which, in turn, is fixedly secured in an opening 68 in wall 28 by any suitable means such as a press fit providing a fluid seal. The rod 50 also extends through a central opening 70 in retaining member 62 and is provided with a threaded portion 72.

A circular fitting 74 through which rod 50 extends is provided with an annular recess 76 partially defined by a radially extending flange 78 the outermost portion of which is angled as at 80 to define a stop portion 82 engageable with fitting 66 to thereby limit axial travel of rod 50 accordingly. The fitting 74 is adapted to seat against an annular flexible seal such as a conventional O-ring 84 contained by a recess portion 86 in retaining member 56. The seal 84 is compressed between fitting 74 and retaining member 56 to provide a fluid seal therebetween.

The fitting 74 is urged against seal 84 by a sleeve 88 slidably received on rod 50. The annular spacing member 90 slidably received on rod 50 bears against sleeve 88 and is secured in position axially by a lock nut 92 threadedly secured on threaded portion 72. The spacing member 90 is received by opening 70 in retaining member 62 with sufficient clearance provided between the adjacent walls of spacing member 90 and retaining member 62 to allow slidable movement therebetween with a minimum of air leakage therethrough from chamber 34 to chamber 32.

A bellows 94 surrounding rod 50 is fixedly secured at opposite ends to fitting 66 and fitting 74, respectively, by suitable means such as soldering or the like to provide a positive seal against fluid leakage between air and fuel on opposite sides of bellows 94. It will be understood that the bellows 94 is relatively small is diameter and formed of a suitable layer of thin metal to reduce to a minimum the spring rate of bellows 94. For example, one commercially available bellows 94 which has been found to be acceptable in the above-mentioned environment has inner and outer diameters of 0.120 and 0.220 inches, respectively and is formed of nickel metal suitably deposited on a bellows-shaped mandrel to approximately 0.001 inch thickness thereby establishing a spring rate of approximately four pounds per inch. Since the operating range of axial movement of rod 50 is on the order of 0.010 inch, it will be understood that the force involved in the compression of bellows 94 is minor and may be neglected or easily compensated for. Limits to compression and expansion of bellows 94 are established by engagement of stop 82 with fitting 66 and seating of valve 48 against seat 43, respectively. The mean effective area of bellows 94 is selected to equal the flow area of valve seat 43 which results in the force derived from pressure $P_2$ acting against valve 48 and tending to seat the same being equalized by an opposing substantially equal force.

An annular spring retaining member 96 having a central opening 98 is equivalent in diameter to that of opening 70 in retaining member 62. A cup-shaped member 100 slidably received by rod 50 is arranged with its rim portion abutting annular retaining member 98. A lock nut 102 engaged with threaded portion 72 and bearing against cup-shaped member 100 retains cup-shaped member 100 and retaining member 96 bearing against the latter in position on rod 50. A compression spring 104 interposed between retaining member 96 and retaining member 62 provides a predetermined force preload tending to urge the same apart. A compression spring 106 interposed between wall 28 and diaphragm 30 imposes a predetermined force preload on diaphragm 30 in opposition to compression spring 104.

The compression spring 106 corresponds to the "constant effort" spring shown and described in above-mentioned U.S. Pat. No. 3,114,359. In general, spring 106 serves to maintain a substantially constant preload against diaphragm 30 which preload assists the $P_r-P_v$ pressure differential across diaphragm 30 to thereby maintain a substantially constant linear relationship between the fuel pressure differential $P_1-P_2$ and the air pressure differential $P_r-P_v$ at relatively low values of the latter differential.

The compression spring 104 corresponds to the "constant head" spring shown and described in above-mentioned U.S. Pat. No. 3,114,359. The spring 104 is extended at low air flow when the air pressure differential $P_r-P_v$ across diaphragm 30 is correspondingly low which extension results in retaining member 62 being biased against casing 22 which acts as a stop. The opposite end of spring 104 which bears against retaining member 96 serves to load stem 50 in a direction to open ball valve 48. The pressure differential $P_1-P_2$ across diaphragm 36 required to balance the force of spring 104 results in a rich fuel mixture at engine idle speeds.

Reference is made to U.S. Pat. No. 3,114,359 for additional details of the above-mentioned "constant effort" and "constant head" springs 104 and 106 if desired.

The valve seat 43 and/or fitting 66 may be provided with shims 108 and 110, respectively, of suitable thickness to adjust the positions of same for calibration purposes.

We claim:

1. Fuel control apparatus for a combustion engine having an air intake comprising:
    fuel conduit means having an inlet connected to a source of pressurized fuel and an outlet connected to supply metered fuel to the engine;
    first valve means including a metering restriction and a valve member for varying the flow area of said metering restriction in said fuel conduit means for controlling fuel flow therethrough;
    second valve means operatively connected to said fuel conduit means for controlling the fuel pressure differential across said restriction and thus the flow of fuel therethrough to said engine;
    an air pressure differential responsive means operatively connected to said air intake and responsive to a control air pressure differential indicative of mass air flow consumed by the engine;
    a fuel pressure differential responsive means operatively connected to said fuel conduit and responsive to the fuel pressure differential across said restriction;
    a fixed wall separating said air and fuel pressure differential responsive means;
    an opening in said fixed wall;
    a control rod extending through said opening for axial movement relative thereto and operatively connected to said valve member and said air and fuel pressure differential responsive means for actuating said valve member to establish a force balance on said control rod; and
    a bellows fixedly secured at one end to said wall coaxial with said opening and fixedly secured at the opposite end to said control rod coaxial therewith for preventing fluid communication between said air and fuel pressure differential responsive means and resiliently supporting said control rod for axial movement through said opening;
    said control rod having an effective range of axial movement of approximately 0.010 inches such that the compression of said bellows is limited accordingly;
    said bellows having an outer diameter of approximately 0.220 inches and a mean effective area substantially equal to the flow area of said valve orifice;
    and wherein said fuel pressure differential responsive means is provided with a central portion having a recess therein adapted to receive an annular resilient seal member;

a circular member having a central opening through which said rod extends and a radially extending flange portion adapted to bear against said resilient seal member;

means including a fastener threadedly engaged with said rod for urging said circular member against said annular seal member to compress same thereby establishing a fluid seal.

2. Fuel control apparatus as claimed in claim 1 wherein:

said last named means includes a sleeve member slidably carried on said rod;

a fitting carried on said rod and bearing against said sleeve;

said fastener bearing against said fitting for securing said fitting, sleeve and circular member in position on said rod.

3. Fuel control apparatus as claimed in claim 2 and further including:

said air pressure differential responsive means is provided with a central opening adapted to slidably receive said fitting;

annular spring retaining means provided with a central opening through which said rod extends;

fastening means threadedly engaged with said rod and engageable with said annular spring retaining means for retaining same on said rod;

spring means interposed between said annular spring retaining means and said air pressure differential responsive means for imposing a predetermined force preload against said air pressure differential responsive means.

4. Fuel control apparatus as claimed in claim 1 and further including:

first spring means interposed between said fixed wall and said air pressure differential responsive means for imposing a first predetermined force preload on said air pressure differential responsive means tending to open said valve means;

second spring means operatively connected to said control rod and said air pressure differential responsive means for imposing a second predetermined force preload on said first air pressure differential responsive means in opposition to said first spring means.

5. Fuel control apparatus as claimed in claim 1 wherein:

said opening in said fixed wall is adapted to receive a fitting fixedly secured therein;

said flange portion being engageable with said fitting to limit axial movement of said rod in a valve opening direction.

* * * * *